US011714660B2

(12) United States Patent
Callery et al.

(10) Patent No.: US 11,714,660 B2
(45) Date of Patent: Aug. 1, 2023

(54) TRIGGER BASED CONFIGURATION OF CONTINUOUS DELIVERY PIPELINE

(71) Applicant: Hewlett Packard Enterprise Development LP, Houston, TX (US)

(72) Inventors: John Callery, Galway (IE); Pablo Gonzalo Sanchez, Galway (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 294 days.

(21) Appl. No.: 16/868,875

(22) Filed: May 7, 2020

(65) Prior Publication Data
US 2021/0349736 A1    Nov. 11, 2021

(51) Int. Cl.
*G06F 9/445* (2018.01)
*G06F 9/30* (2018.01)
(Continued)

(52) U.S. Cl.
CPC ............ *G06F 9/44505* (2013.01); *G06F 8/60* (2013.01); *G06F 9/30079* (2013.01);
(Continued)

(58) Field of Classification Search
CPC ... G06F 8/60; G06F 8/61; G06F 16/25; G06F 9/44505; G06F 9/30079; G06F 9/542
See application file for complete search history.

(56) References Cited

U.S. PATENT DOCUMENTS 7,320,007 B1 *  1/2008  Chang ................... G06F 40/186
                                                707/999.102
10,515,005 B1   12/2019  Burrell et al.
(Continued)

FOREIGN PATENT DOCUMENTS

CN      109460350 A      3/2019
EP        3407188 A1    11/2018

OTHER PUBLICATIONS

De Santi, Matias, "Wolox—Configuring a Jenkins Pipeline using a YAML file", Apr. 20, 2018, https://medium.com/wolox/dynamic-jenkins-pipelines-b040663711fbc, downloaded Apr. 6, 2020, 15 pages.
(Continued)

*Primary Examiner* — Raymond N Phan
(74) *Attorney, Agent, or Firm* — Hewlett Packard Enterprise Patent Department

(57) ABSTRACT

Embodiments described herein are generally directed to a configuration-driven continuous delivery (CD) pipeline that can be used by multiple development teams and integrated with multiple repositories. According to an example, all commands to be run by a particular executor used by a particular development team are specified by the pipeline. A trigger event is received from an external source specifying a repository in which source code for an application being developed or maintained by the particular development team resides. Responsive to the trigger event, the pipeline is configured with information regarding subdirectories within the repository that are to be processed based on a first set of configuration information stored in the repository. Stages of the pipeline are performed by, for each subdirectory, causing the pipeline to issue a subset of the commands to the particular executor based on a second set of configuration information associated with the subdirectory.

20 Claims, 6 Drawing Sheets

(51) Int. Cl.
*G06F 11/36* (2006.01)
*G06F 16/25* (2019.01)
*G06F 8/60* (2018.01)
*G06F 9/54* (2006.01)

(52) U.S. Cl.
CPC .......... *G06F 9/542* (2013.01); *G06F 11/3668* (2013.01); *G06F 16/25* (2019.01)

(56) References Cited

U.S. PATENT DOCUMENTS

| | | | |
|---|---|---|---|
| 10,565,093 B1* | 2/2020 | Herrin | G06F 8/77 |
| 11,277,415 B1* | 3/2022 | Rinehart | H04L 69/28 |
| 2015/0248301 A1* | 9/2015 | Shani | G06F 9/44521 717/163 |
| 2017/0288967 A1 | 10/2017 | Naqvi et al. | |
| 2020/0218623 A1* | 7/2020 | Zhang | G06N 7/005 |
| 2021/0133091 A1* | 5/2021 | Pillai | G06F 11/3692 |
| 2021/0234749 A1* | 7/2021 | Vazirani | H04L 67/34 |

OTHER PUBLICATIONS

GitLab, "GibLab CI/CD Pipeline Configuration Reference", https://docs.gitlab.com/ee/ci/yami/, downloaded Apr. 6, 2020, 77 pages.
Microsoft Docs, "Build, test and deploy .NET Core apps", Oct. 17, 2019, https://docs.microsoft.com/en-us/azure/devops/pipelines/ecosystems/dotnet-core?view=azure-devops downloaded Apr. 6, 2020 16 pages.
Phyu Phyu Than and Myat Pwint Phyu, "Continuous Integration for Laravel Applications with Gitlab," 2019, pp. 1-6, ACM.
Stefano Gioia, "Have You Ever Considered CI/CD as a Service?", Cisco Biogs, Jun. 4, 2018, available at https://blogs.cisco.com/cloud/have-you-ever-considered-ci-cd-as-a-service.
Duvall et al., "Continuous Integration: Improving Software Quality and Reducing Risk", available online at <https://www.oreilly.com/library/view/continuous-integration-improving/9780321336385/>, Jun. 2007, 6 pages.
GitLab Foss, "Ability to share a single CI configuration file for many repositories", available online at <https://gitlab.com/gitlab-org/gitlab-foss/-/issues/40424>, Oct. 3, 2019, 2 pages.
Gitlab, "Make it possible to use any language to generate '.gitlab-ci.yml' and pipelines", available online at <https://gitlab.com/gitlab-org/gitlab-foss/-/issues/45828?fbclid=lwAR0cp65OnlByRWdBls—O5ktlavheGF-7sezJFxZ2Ku0eVXpKcNXt11CE24.>, Oct. 3, 2019, 13 pages.
Jose Javi Asilis, "Configuring .gitlab-ci.yml", available online at <https://hackernoon.com/configuring-gitlab-ci-yml-150a98e9765d>, Apr. 23, 2018, 33 pages.
M. Fowler, "Continuous Integration", available online at <https://martinfowler.com/articles/continuouslntegration.html>, May 1, 2006, 31 pages.
Matias De Santi, "Configuring a Jenkins Pipeline using a YAML file", available online at <https://medium.com/wolox/dynamic-jenkins-pipelines-b04066371fbc>, Apr. 21, 2018, 806 pages.
Michael Hilton et al., "Understanding and improving continuous integration", 24th ACM SIGSOFT International Symposium, 2016, 2 pages.
Riley MacDonald, "How I setup continuous integration for web development", Nov. 12, 2017, 5 pages.
Seth et al., "ACI (automated Continuous Integration) using Jenkins: Key for successful embedded Software development", 2nd International Conference on Recent Advances in Engineering & Computational Sciences (RAECS), 2015, 6 pages.
Shahed C, "YAML-defined CI/CD for ASP .Net Core", available online at <https://wakeupandcode.com/yaml-defined-cicd-for-asp-net-core/>, Jun. 24, 2019, 11 pages.
Stefano Gioia, "Have You Ever Considered CI/CD as a Service?", Cisco, available online at <https://blogs.cisco.com/cloud/have-you-ever-considered-ci-cd-as-a-service>, Jun. 4, 20183 Comments, 10 Pages.
Tim et al., "Continuous Integration Processes for Modern Client-Side Web Applications", 5th International Electrical Engineering Congress, 2017, 4 pages.
Vasilescu et al., "Quality and Productivity Outcomes Relating to Continuous Integration in GitHub", 10th Joint Meeting on Foundations of Software Engineering, 2015, 12 pages.

* cited by examiner

300

```
application:
    name: "application-name"
scratch_org:
    alias: "scratchorg-name"
    definition_file: "config/project-scratch-def.json"
    wait: 10
community_portal:
    deploy: false
    name: "Sample Name"
    template: "Aloha"
    url_path_prefix: "path"
    description: "Community"
    api_version: "v47.0"
dependencies:
    packages:
        - "04t..."
        wait: 10
        security: "AllUsers"
metadata:
    - origin: "./unpackagedmetadata/default/."
    destination: "./force-app/main/default"
    templates: "./unpackagedmetadata/templates/."
    propsdir: "./unpackagedmetadata/vars/."
    push_a_source: "false"
    vaultEndPath: "/path"
anonymous_apex:
    classes:
        - "file1.cls"
        - "file2.cls"
data:
    plan: "./data/Plan.json"
```
— 310

- 311 → application:
- 312 → scratch_org:
- 313 → dependencies:
- 314 → metadata:

```
tests:
    run_selenium: false
    selenium_folder: "tests/selenium"
    selenium_suite: "test-suite-selenium"
    selenium_suite_scratchorg: "test-suite-selenium-so"
    apex_suite: "ApexSuite"
    synchronous: false
    format: "json"
    run_jest: true
    jest_suite: "test:unit"
```
— 320

```
package:
    deploy_type: "MD"
    wait: 60
    package_name: "SalesForce-app"
    type: "Unlocked"
    description: "SalesForce community app"
    app_folder: "force-app/main"
    installation_key:
    definition_file: "config/project-def.json"
    exclude_folders: ["app/images", "app/something"].
```
— 330

*FIG. 3*

TRIGGER BASED CONFIGURATION OF CONTINUOUS DELIVERY PIPELINE

BACKGROUND

DevOps (a combination of software development (Dev) and information-technology (IT) operations (Ops)), microservices, and containerization have changed the way applications are represented, developed, tested and deployed.

DevOps is a set of practices that automates the processes between software development and IT teams that seeks to facilitate building, testing, and releasing of software faster and more reliably. DevOps involves continuous planning, continuous testing, continuous integration, continuous delivery and other forms of continuous evolution of both the project and the software.

Microservice architecture takes advantage of the fact that applications are simpler to build and maintain when broken down into smaller pieces that work seamlessly together. As such, in contrast to the more traditional monolithic application architectures, the microservice architecture is an architectural style that structures an application as a collection of smaller, more specialized parts called services (or microservices), each of which communicate with one another across common interfaces (e.g., application programming interfaces (APIs) and representational state transfer (REST) interfaces, like Hypertext Transfer Protocol (HTTP). Microservices are increasingly being used in the development world as developers work to create larger, more complex applications that are better developed and managed as a combination of smaller services that work cohesively together for more extensive, application-wide functionality.

Continuous delivery pipelines are designed to allow software to be automatically built, tested and deployed with maximum speed and minimum effort. Traditionally, continuous delivery pipelines have been built for a particular use case with each development team creating and managing their own continuous delivery pipeline.

BRIEF DESCRIPTION OF THE DRAWINGS

Embodiments described here are illustrated by way of example, and not by way of limitation, in the figures of the accompanying drawings in which like reference numerals refer to similar elements.

FIG. 3 is a structured configuration file in accordance with an example embodiment.

DETAILED DESCRIPTION

Figure 1:
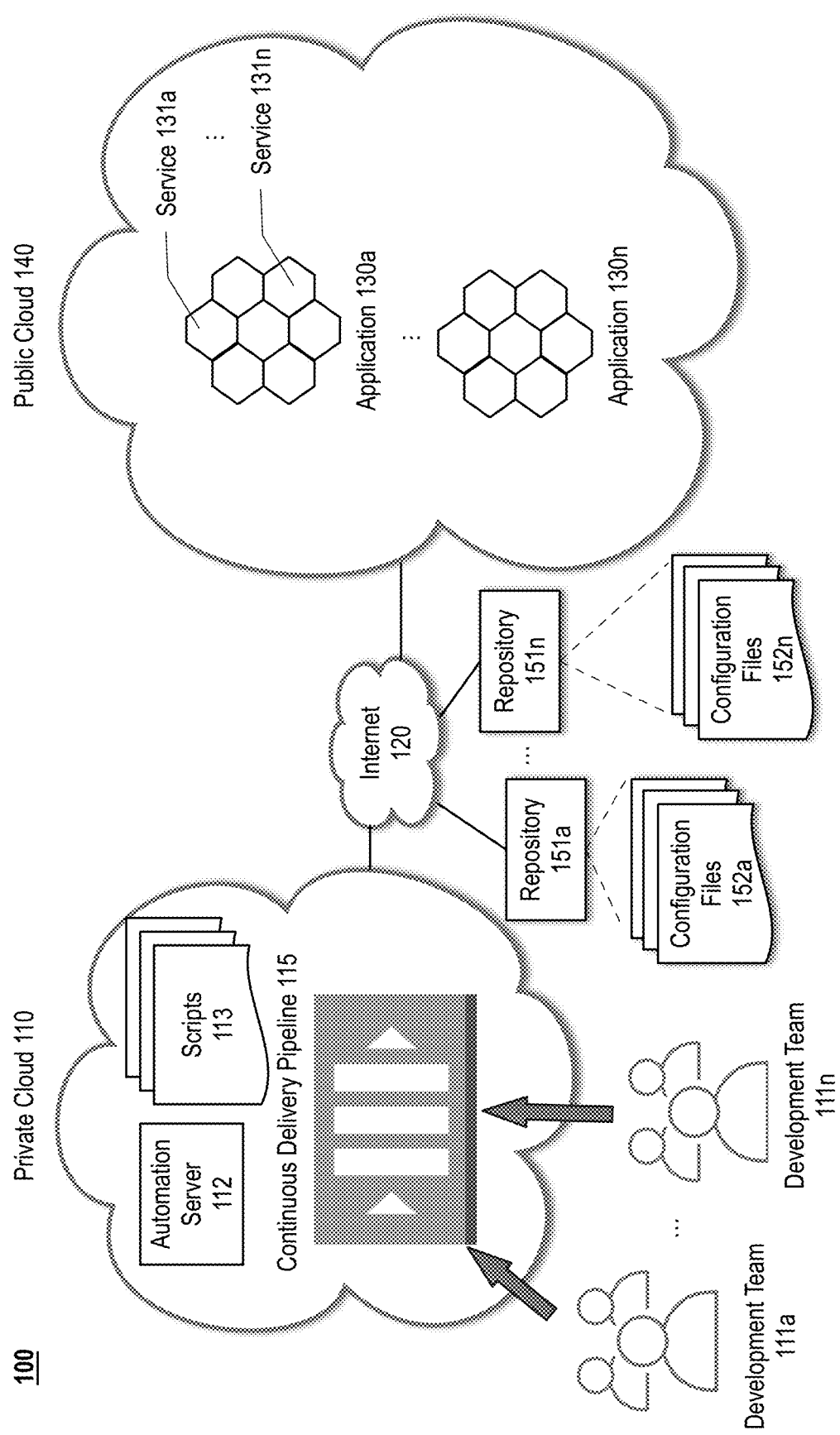
FIG. 1 is a block diagram conceptually illustrating an environment in which a configuration-driven continuous delivery pipeline may be employed in accordance with an example embodiment.

Embodiments described herein are generally directed to a configuration-driven continuous delivery pipeline that can be used by multiple development teams and integrated with multiple repositories. In the following description, numerous specific details are set forth in order to provide a thorough understanding of example embodiments. It will be apparent, however, to one skilled in the art that embodiments described herein may be practiced without some of these specific details.

The current practice of having each development team build and maintain their own continuous delivery pipeline is inefficient and creates security risks. In addition to managing application features and functionality as well as the process of building, releasing and integrating software, development teams are burdened with the task of learning pipeline technology in order to create a customized continuous delivery pipeline suitable for their needs. The use of configuration files, such as Yet Another Markup Language (YAML) files, to specify commands to be programmatically run by the executor (e.g., Jenkins, TeamCity, Bamboo, GitLab, Microsoft Azure, and others) reduces some of the challenges and inconveniences involved in building a continuous delivery pipeline, but current implementations violate basic separation of duties issues and raise security concerns. For example, there are no guarantees that unauthorized commands will not be mistakenly or maliciously introduced into the pipeline.

Embodiments described herein seek to ensure a clear separation of concerns between development teams and a pipeline administrator (or pipeline development team). According to one embodiment, a configuration-driven continuous development pipeline is presented to multiple development teams as a black box that can be configured by the development teams in accordance with their respective needs while preserving security and guaranteeing no unauthorized commands are executed. For example, in one embodiment, the commands run by the executor are specified by one or more scripts that are separately maintained and controlled by the pipeline administrator, whereas the development teams themselves simply provide configuration information that is decoded by the script(s) into appropriate test/deployment steps.

Additionally, embodiments described herein provide a configuration-driven software delivery pipeline that enables concurrent integration with many source code repositories and use by many different development teams without having to change the pipeline and without the development teams having to understand the underlying details of the implementation of the pipeline. According to one embodiment, multiple development teams may leverage the same configuration-driven software delivery pipeline by customizing team-specific configuration information that may be stored in predefined or configurable locations within their respective repositories. As such, as new features are added to the pipeline, all teams can avail themselves of these new features. Meanwhile, the development teams may control the output of the pipeline based on their respective team-specific configuration information without requiring a deep understanding of pipeline technologies. In this manner, development teams can control the pipeline while treating it as a black box.

While for purposes of illustration embodiments are described herein in the context of a continuous delivery pipeline, those skilled in the art will appreciate the methodologies described herein are equally applicable to a continuous deployment pipeline. Similarly, while in certain embodiments no commands are permitted to be included within the team-specific configuration information and all commands issued to the executor are specified by the configuration-driven continuous delivery pipeline, for example, represented in the form of one or more scripts, in alternative embodiments, some limited set of commands (e.g., commands authorized by the pipeline administrator) may be permitted to be included within the team-specific configuration information.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein, a "structured configuration file" generally refers to human-readable structured data formats. Non-limiting examples of structured configuration files include configuration information contained within eXtensible Markup Language (XML) files, JavaScript Object Notation (JSON) files, Comma-Separated Values (CSV) files, and YAML files. As described further below, in some embodiments, configuration files may be stored in predefined or configurable locations of a repository in which source code created by a development team resides. In alternative embodiments, configuration information used to configure a software delivery pipeline may also be provided from a database.

FIG. 1 is a block diagram conceptually illustrating an environment 100 in which a configuration-driven continuous delivery pipeline 115 may be employed in accordance with an example embodiment. In the context of the present example, an executor (e.g., an automation server 112) that runs commands (e.g., contained within scripts 113) associated with the configuration-driven continuous delivery pipeline 115 is hosted by a private cloud 110 accessible to multiple development teams 111a-n. The private cloud 110 may represent a particular developer service environment (e.g., Salesforce Developer Experience (SFDX), Amazon Web Services (AWS) Elastic Container Service (ECS), AWS Elastic Kubernetes Service (EKS), or the like). In one embodiment, a separate script may be provided for each stage of the configuration-driven continuous delivery pipeline 115. Alternatively, a script of scripts 113 may represent commands for performance of multiple stages of the configuration-driven continuous delivery pipeline 115.

The development teams 111a-n may be responsible for building, releasing and integrating software for various web applications 130a-n and/or different components (e.g., services 131a-n) of the applications 130a-n that may run within a public cloud 140 (e.g., a container orchestration platform provided by Amazon Web Services (AWS) (e.g., the Amazon Elastic Kubernetes Service (EKS)), Google (e.g., the Google Kubernetes Engine (GKE)), or Microsoft (e.g., the Azure Kubernetes Service (AKS)). According to one embodiment, the development teams 111a-n are able to make use of the same configuration-driven continuous delivery pipeline 115, which may be represented in the form of the scripts 113 containing commands to be run by the automation server 112 (e.g., Jenkins, TeamCity, Bamboo, GitLab, Microsoft Azure, or others). For example, the scripts 113 may be Jenkins script files.

The source code (not shown) developed by the development teams 111a-n may reside in various repositories 151a-n. The repositories 151a-n may represent separate cloud-based source code repository hosts (e.g., Bitbucket, SourceForge, ProjectLocker, GitLab, CloudForge, Launchpad, Codeplane, and the like) accessible via the Internet 120, on-premise tools, and/or different directories or subdirectories within the same source code repository host or on-premise tool.

As described in further detail below, according to one embodiment, structured configuration files (e.g., configuration files 152a-n) may be used by the development teams 111a-n to customize the configuration-driven continuous delivery pipeline 115 in accordance with their respective needs and/or preferences. For example, the development teams 111a-n may, among other things, set configuration parameters within the configuration files 152a-n to specify preferred Static Application Security Testing (SAST) tools (e.g., Checkmarx, Micro Focus Fortify, Veracode, etc.), unit testing (e.g., Apex, Junit for Java or Nunit for .Net, etc.) and/or automated web application testing tools (e.g., Selenium, Katalon Studio, Subject7, Screenster, TestCraft, Endtest, etc.), that are to be used to scan their source code and/or whether such testing is enabled or disabled. A non-limiting example of one type of structured configuration file that may be used in various embodiments is described below with reference to FIG. 3.

In one embodiment, a clear separation of concerns may be imposed by prohibiting issuance of any commands (e.g., SFDX, aws-shell, PowerShell, Bourne Again Shell (Bash), Apache Maven, and other command line or shell programs) to the automation server 112 from within the configuration files 152a-n. For example, all commands to be run by the automation server 112 may be included within the scripts 113. In this manner, by limiting which users (e.g., a designated pipeline development team or individual) may modify the scripts 113, various security concerns may be addressed, including ensuring no unauthorized commands will be run by the automation server 112. Non-limiting examples of the various pipeline stages and processing that may be automated in accordance with various embodiments is described below with reference to FIG. 4 and FIG. 5.

The automation server 112, the continuous delivery pipeline 115, and the repositories 151a-n described above with reference to FIG. 1 and the processing described below with reference to the flow diagrams of FIG. 2, FIG. 4, and FIG. 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 6 below.

Figure 2:
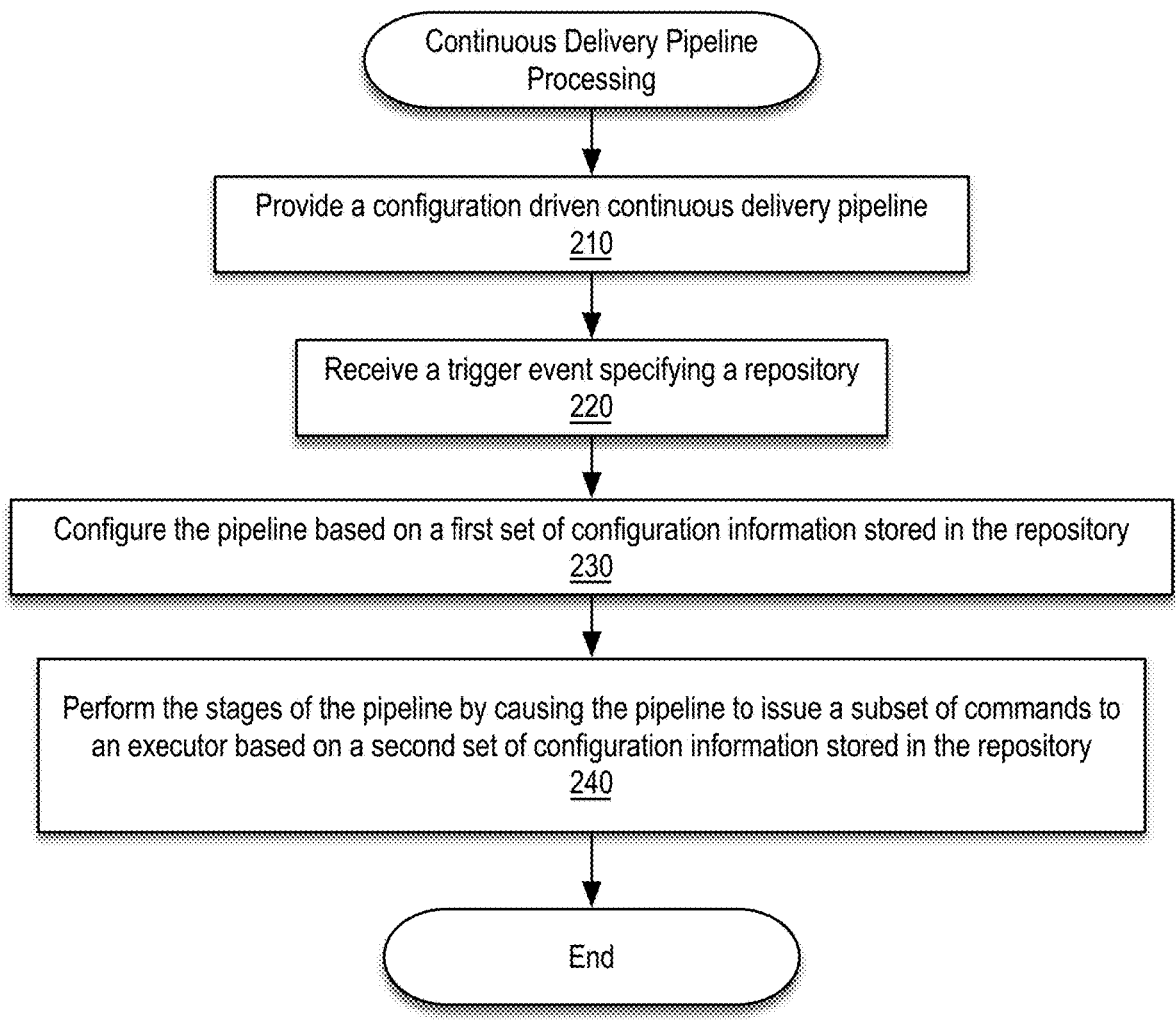
FIG. 2 is a flow diagram illustrating continuous delivery pipeline processing in accordance with an example embodiment.

FIG. 2 is a flow diagram illustrating continuous delivery pipeline processing in accordance with an example embodiment. In the context of the present example, at block 210, a configuration-driven continuous delivery pipeline is provided. According to one embodiment the configuration-driven continuous delivery pipeline (e.g., continuous delivery pipeline 115) is represented as a series of stages (e.g., build, test, and deployment) in the form of commands within one or more scripts (e.g., scripts 113) that are run by an executor (e.g., automation server 112).

At block 220, a trigger event is received that specifies a repository. According to one embodiment, the trigger event represents receipt by an automation server of a webhook from a repository (e.g., repository 151a-n) responsive to code commit by a member of a development team (e.g., development team 111a-n). Alternatively or additionally, the trigger event may represent a manual launch of a build step, for example, when a webhook fails or a manual launch is otherwise desired.

At block 230, the pipeline is configured based on a first set of configuration information stored in the repository. According to one embodiment, the first set of configuration information, for example, in the form of a structured configuration file is stored in a predetermined or configurable location within the repository (e.g., the root directory of the repository) and includes a manifest of subdirectories in the repository that the pipeline should process. For example, a default YAML file may be created in the root of a GitHub repository and the subdirectories may represent various components and/or dependencies associated with the application (e.g., application 130a-n) at issue.

At block 240, the stages of the pipeline are performed by causing the pipeline to issue a subset of commands to an executor based on a second set of configuration information, for example, in the form of one or more structured configuration files stored in each subdirectory of the repository. According to one embodiment, the portion of the second set of configuration information associated with each subdirectory contains specific information that configures the pipeline to create the correct output for the particular subdirectory. In one embodiment, the YAML file within each subdirectory identified in the manifest includes three main sections (e.g., an application section, a tests section and a package section). The application section may configure the application including the name, definition files, community portal, dependencies, if any, and specific code to be executed for the repository at issue. The tests section may configure the test frameworks that are to be executed as part of unit testing and/or acceptance testing steps in the pipeline. The package section may configure the packaging of the solution, by specifying the name, type and location of the code to be packaged for subsequent deployment. A non-limiting example of a structured configuration file in the form of a YAML configuration file is described below with reference to FIG. 3.

While in the context of various embodiments described herein, a structured configuration file is described with reference to a YAML file, those skilled in the art will appreciate other types of structured configuration files, such as XML and/or JSON files may be used.

FIG. 3 is a structured configuration file 300 in accordance with an example embodiment. According to one embodiment, each of multiple development teams (e.g., development teams 111a-n) may control two different sets of configuration information. A first of the two sets of configuration information may include a default structured configuration file, for example, in the form of a YAML file that is stored in the root of a repository (e.g., repository 151a-n) in which the particular development team stores source code for an application (application 130a-n) or service (e.g., service 131a-n). The default structured configuration file may contain a manifest of subdirectories in the repository that are to be processed by a configuration-driven continuous delivery pipeline (e.g., continuous delivery pipeline 115). A second of the two sets of configuration information may be provided in the form of a second structured configuration file, for example, in the form of a second YAML file stored within each subdirectory of the repository. Structured configuration file 300 represents an example of one of the second structured configuration files that may be stored within each subdirectory of the repository.

According to one embodiment, the structured configuration file 300 contains the specific configuration information to be fed to the continuous delivery pipeline to create the correct output for the particular subdirectory. In one embodiment, contrary to existing approaches that use YAML for deployments, the structured configuration file 300 excludes commands (e.g., command line and/or shell commands) and only includes application configuration information. In this manner, a clear separation of duties/concerns may be enforced in which a pipeline administrator (or pipeline development team) has exclusive control over the implementation details of various stages of the continuous delivery pipeline while multiple development teams are able to leverage the features provided by continuous delivery pipeline without requiring knowledge regarding the underlying implementation details of the continuous delivery pipeline. For example, the pipeline administrator may specify the order and flow of various stages of the pipeline as well as the commands that are available for execution during each of the various stages, for example, via one or more scripts (e.g., scripts 113). Meanwhile, multiple development teams, potentially using different types of repositories, may customize their respective team-specific configuration information to, among other things, integrate their respective repositories, specify code files (or a directory containing code files) to be executed during test and/or deployment, specify data files (or a directory containing data files) to be imported during test and/or deployment, specify whether and by which Static Application Security Testing (SAST) tool scanning is to be performed, and specify whether and by which code debugging tool, JavaScript tests, and web application tests the source code is to be subjected.

In this manner, a clear separation of duties/concerns may be enforced in which a pipeline administrator has control over the implementation details of various stages of the continuous delivery pipeline as well as the commands that are available for execution during each of the various stages, for example, via one or more scripts (e.g., scripts 113) and multiple development teams, potentially using different types of repositories, may integrate their respective repositories and configure the continuous delivery pipeline in accordance with their needs.

In the context of the present example, the structured configuration file 300 is represented in the form of a YAML file and includes an application section 310, a tests section 320, and a package section 330. The application section 310 may configure the application including the name, definition files (see, e.g., scratch_org block 311), community portal (see, e.g., community_portal block 312), any dependencies (see, e.g., dependencies block 313) that are required, and any specific code that is to be executed for this repository. The application section 310 also includes information regarding data (see, e.g., metadata block 314) that is to be loaded.

The tests section 320 may be used to configure various test frameworks that are to be executed as part of unit and/or User Acceptance Testing (UAT) steps in the pipeline. In the context of the present example, the tests section 320 makes use of Selenium for frontend/integration tests, defines a set of Apex tests and Jest tests, and specifies JSON as the output format of the test results.

The package section 330 may be used to specify various packaging options. For example, the package section 330 may, among other things, configure the package name to be created in production, the packaging type (e.g., standard (STD) or metadata (MD)), the package type, and the location of the code to be packaged for subsequent deployment.

While in the context of the present example structured configuration file 300 is described with reference to a specific YAML file used within a particular developer service environment, those skilled in the art will appreciate, the structured configuration file 300 may be in the form of other human-readable structured data formats, including, but not limited to XML and JSON. Similarly, more or fewer configuration options may be provided to the development teams depending upon the particular implementation.

According to one embodiment, a configuration-driven continuous delivery pipeline (e.g., continuous delivery pipeline 115) is represented in the form of one or more scripts (e.g., scripts 113) that is maintained by a pipeline administrator (or pipeline development team). The scripts may include commands that are run by an executor to perform various stages (e.g., build, test, and deployment). Non-limiting examples of build/test processing and package/test processing that may be implemented by the configuration-driven continuous delivery pipeline and leveraged by multiple development teams are described below with reference to FIG. 4 and FIG. 5, respectively.

Figure 4:
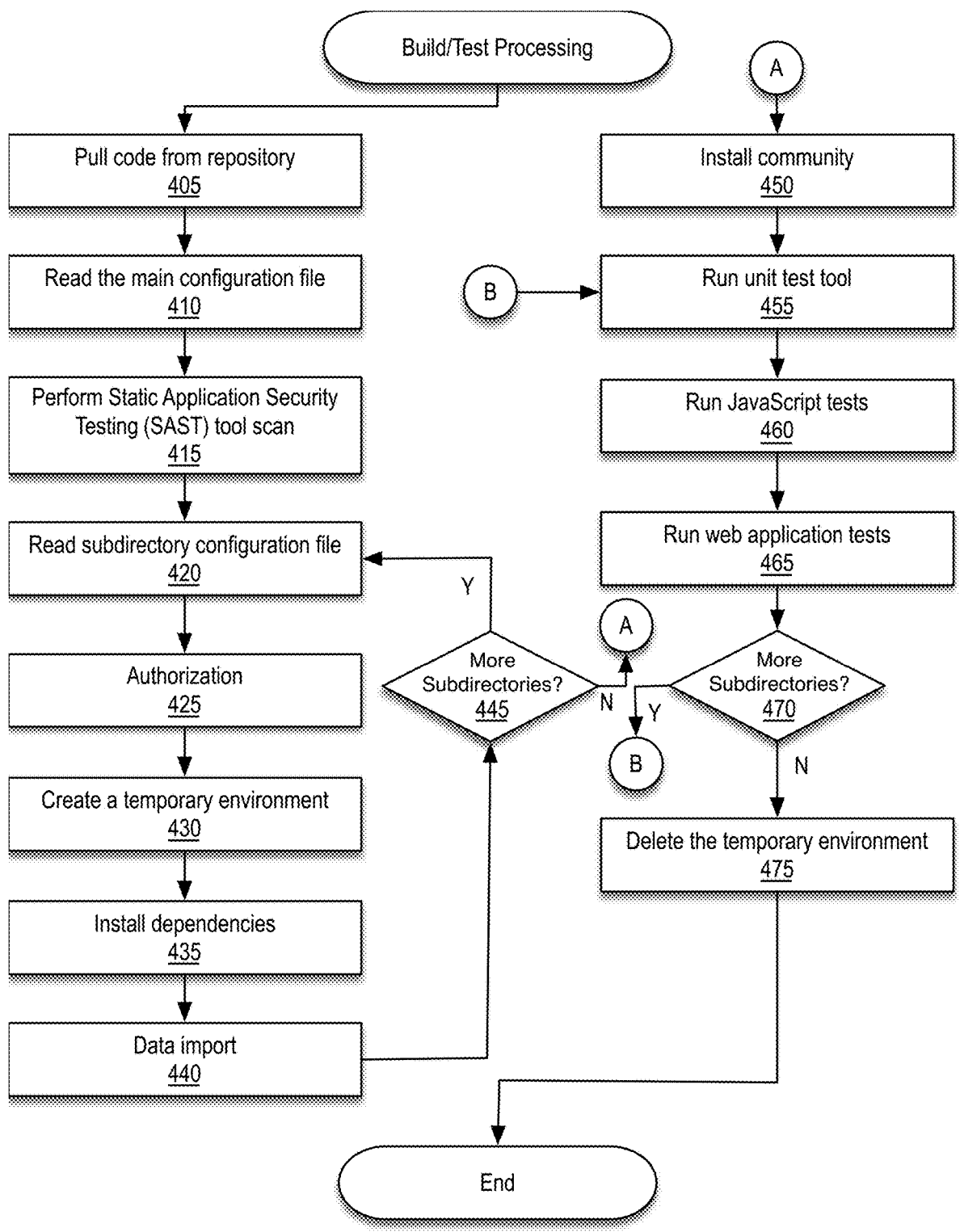
FIG. 4 is a flow diagram illustrating build/test processing in accordance with an example embodiment.

FIG. 4 is a flow diagram illustrating build/test processing in accordance with an example embodiment. In the context of the present example, at block 405, code is pulled from the repository. For example, the source code files associated with the particular application (e.g., application 130a-n) or the particular application component(s) (e.g., services 131a-n) may be checked out of the repository. In one embodiment, block 405 is triggered responsive to receipt by an automation server (e.g., automation server 112) of a trigger event from an external source that specifies a repository (e.g., repository 151a-n) in which the source code that is being developed or maintained by a particular development team resides. Depending upon the particular implementation, the trigger event may be a manual launch of a build step or a webhook received from a repository responsive to a code commit by a member of the particular development team.

At block 410, the main configuration file is read. According to one embodiment, the main configuration file is a first set of configuration information stored in a predetermined or configurable location (e.g., the root directory) within the repository. The main configuration file may be a team-specific structured configuration file (e.g., one of configuration files 152a-n maintained by the particular development team), for example, in the form of a YAML file, containing information regarding those of the subdirectories in the repository that the pipeline should process.

At block 415, a SAST tool scan is performed. In one embodiment, the code checked out from the repository at block 405 is subjected to scanning by a set of one or more predefined or configurable SAST tools e.g., Checkmarx, Micro Focus Fortify, and Veracode).

At block 420, a subdirectory configuration file is read. According to one embodiment, the subdirectory configuration file is part of a second set of configuration information stored in each subdirectory within the repository. The subdirectory configuration file may be a team-specific structured configuration file (e.g., one of configuration files 152a-n maintained by the particular development team), for example, in the form of a YAML file, containing information that configures the pipeline to create the correct output for the particular subdirectory. A non-limiting example of a subdirectory configuration file is the structured configuration file 300 described above with reference to FIG. 3.

At block 425, authorization is performed. For example, in an implementation in which SFDX is the developer service environment, the authorization represents an authorization with the salesforce.com (SFDC) organization.

At block 430, a temporary environment is created. For example, in an implementation in which SFDX is the developer service environment, the temporary environment may be a Salesforce scratch org, a source-driven and disposable deployment of Salesforce code and metadata, that may be created to facilitate testing of a new build.

At block 435, dependencies are installed. For example, any packages, for example, specified by the subdirectory configuration file upon which the package at issue is dependent upon for correct functioning may be installed.

At block 440, data import is performed. For example, any data specified in the subdirectory configuration file to be imported during test/deployment may be loaded.

At decision block 445, a determination is made regarding whether there are more subdirectories to process. For example, this determination may be made with reference to the main configuration file, which list the subdirectories to be processed by the pipeline. If at least one subdirectory remains to be processed, build/test processing loops back to block 420 to process the next subdirectory; otherwise, if all subdirectories have been processed, build test processing branches to block 450.

At block 450, the community is installed. For example, the community portal may be deployed.

At block 455, a unit test tool is run. According to one embodiment, a set of Apex tests (e.g., those specified in the subdirectory configuration file) are run in the temporary environment (e.g., the scratch org) created at block 430.

At block 460, JavaScript tests are run. According to one embodiment, assuming the application at issue is a JavaScript app, the Jest JavaScript test runner is used to test the application.

At block 465, web application tests may be run. According to one embodiment, a framework or tool for testing web applications (e.g., Selenium, Katalon Studio, Subject7, Screenster, TestCraft, Endtest, or the like) may be specified and configured via the subdirectory configuration file.

At decision block 470, a determination is made regarding whether there are more subdirectories to process. For example, this determination may be made with reference to the main configuration file, which list the subdirectories to be processed by the pipeline. If at least one subdirectory remains to be processed, build/test processing loops back to block 455 to process the next subdirectory; otherwise, if all subdirectories have been processed, build test processing branches to block 475.

At block 475, the temporary environment created at block 430 is deleted.

Figure 5:
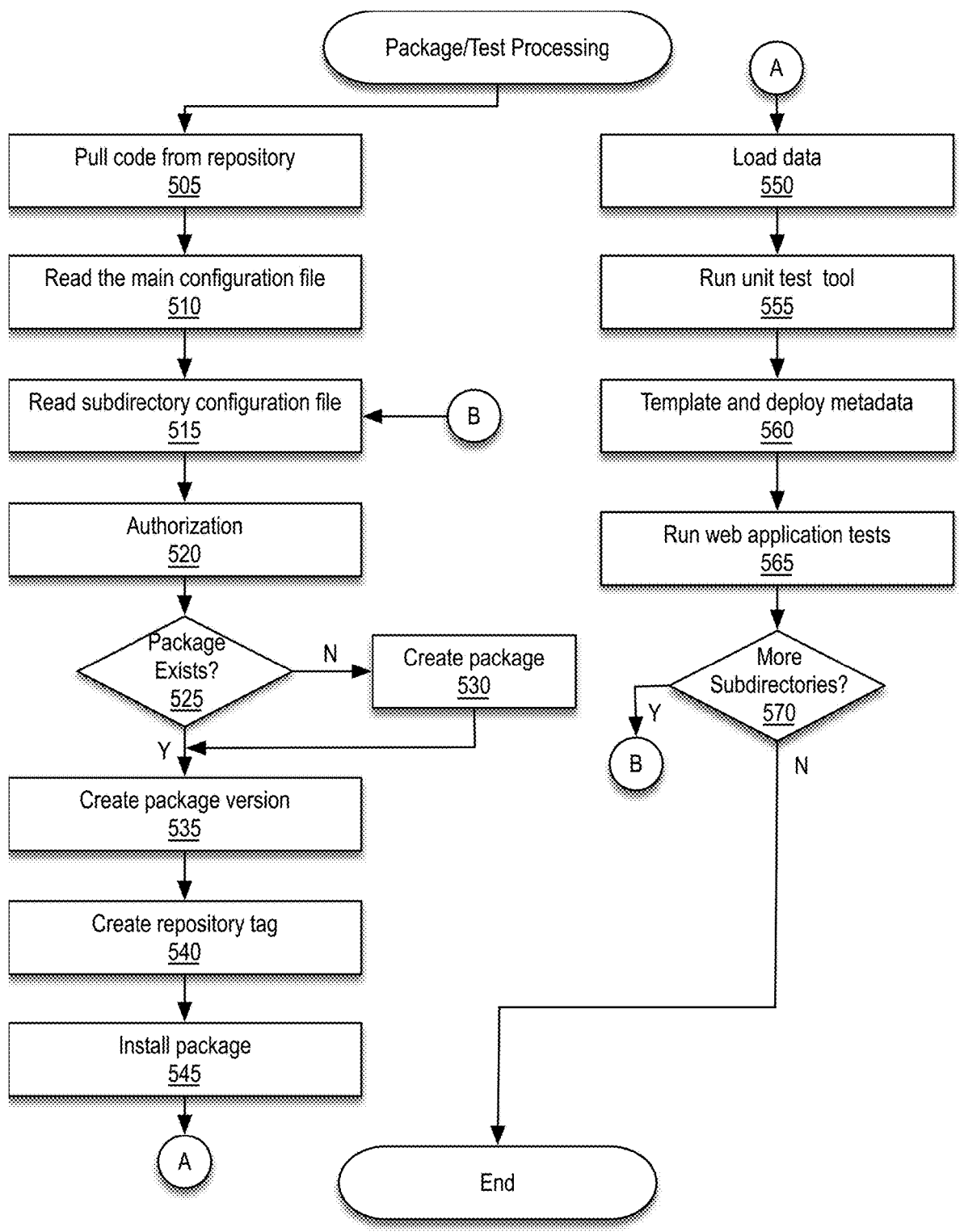
FIG. 5 is a flow diagram illustrating package/test processing in accordance with an example embodiment.

FIG. 5 is a flow diagram illustrating package/test processing in accordance with an example embodiment. In the context of the present example, at block 505, code is pulled from the repository. According to one embodiment the processing performed at block 505 may parallel the processing performed at block 405 of FIG. 4. Depending upon the particular implementation, block 505 may be automatically performed following completion of the processing described above with reference to FIG. 4 or may be independently performed responsive to receipt by an automation server (e.g., automation server 112) of a trigger event from an external source that specifies a repository (e.g., repository 151*a-n*) in which the source code that is being developed or maintained by a particular development team resides. Depending upon the particular implementation, the trigger event may be a manual launch of a build step or a webhook received from a repository responsive to a code commit by a member of the particular development team.

At block 510, the main configuration file is read. According to one embodiment the processing performed at block 510 may parallel the processing performed at block 410 of FIG. 4.

At block 515, a subdirectory configuration file is read. According to one embodiment the processing performed at block 515 may parallel the processing performed at block 420 of FIG. 4.

At block 520, authorization is performed. According to one embodiment the processing performed at block 520 may parallel the processing performed at block 425 of FIG. 4.

At decision block 525, a determination is made regarding whether the package exists. If the package does not exist, then it is created at block 530; otherwise, package/test processing continues with block 535 where a package version is created.

At block 540, a repository tag is created. According to one embodiment, the repository tag identifies a version release within the repository's history. Depending upon the particular implementation, the repository tag may be a reference to a local repository or a remote repository.

At block 545, the package is installed.

At block 550, data is loaded. For example, any data specified in the subdirectory configuration file to be imported during test/deployment may be loaded.

At block 555, a unit test tool is run. According to one embodiment, this involves running the Anonymous Apex tool.

At block 560, metadata is templated and deployed. According to one embodiment, this allows the pipeline to deploy a dynamic configuration into different environment. For example, Uniform Resource Locators (URLs), usernames, and passwords may be different in different in a test, development, or production environment. In one embodiment, templates can be used to ensure the structure of the files is correct, and the values for a specific environment are inserted and deployed at runtime from an environment specific directory.

At block 565, web application tests are run. According to one embodiment the processing performed at block 565 may parallel the processing performed at block 465 of FIG. 4.

At decision block 570, a determination is made regarding whether there are more subdirectories to process. For example, this determination may be made with reference to the main configuration file, which list the subdirectories to be processed by the pipeline. If at least one subdirectory remains to be processed, package/test processing loops back to block 515 to process the next subdirectory; otherwise, if all subdirectories have been processed, package/test processing is complete.

While in the context of the examples described with reference to FIG. 4 and FIG. 5, various specific processing steps are described with reference to a specific developer service (e.g., SFDX) and command line interface (e.g., the SFDX CLI), those skilled in the art will appreciate the techniques described herein are equally applicable to other developer services (e.g., Docker, Kubernetes, AWS ECS, AWS EKS, and the like) and associated command line interfaces.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 6:
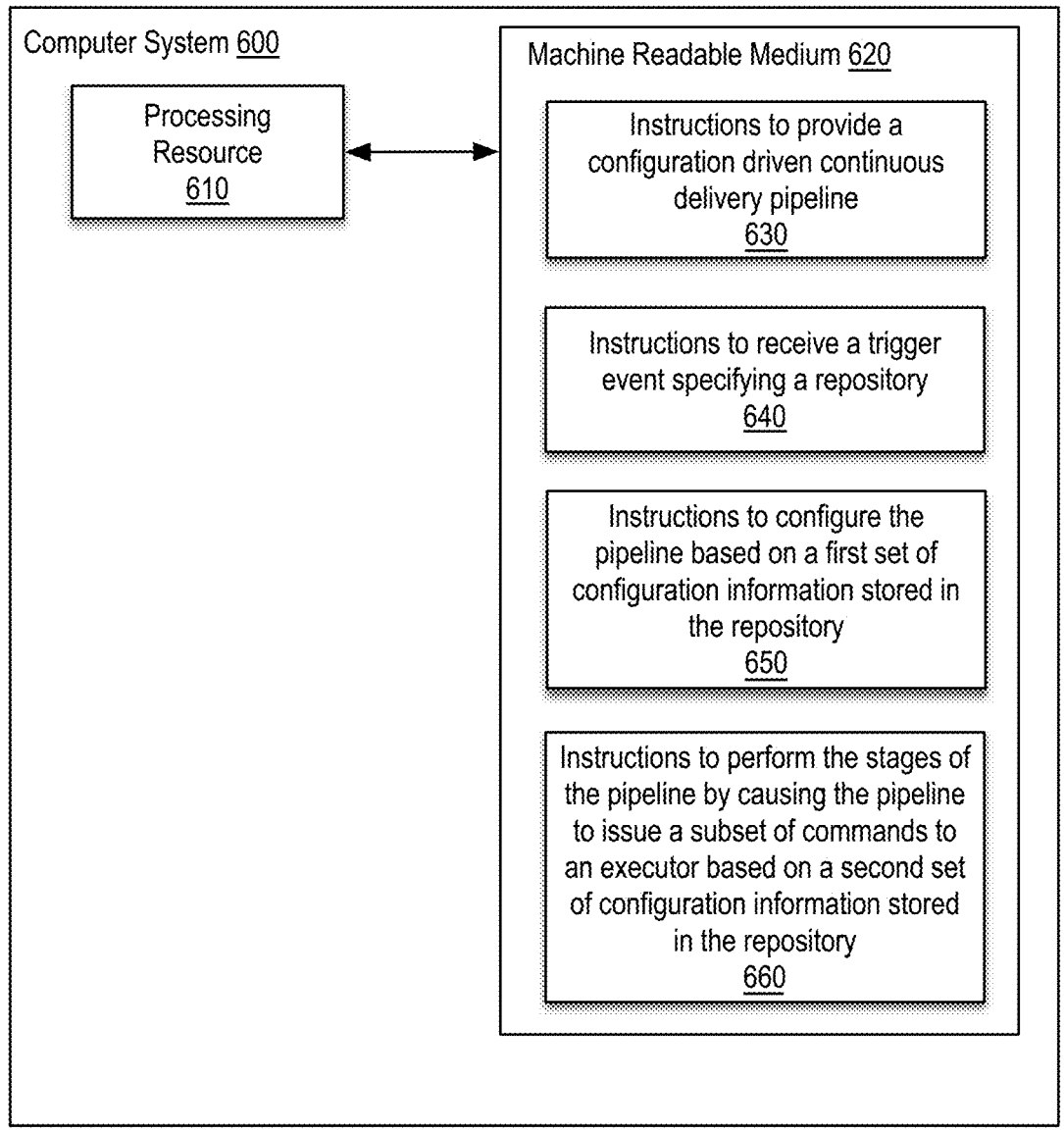
FIG. 6 is a block diagram of a computer system in accordance with an embodiment.

FIG. 6 is a block diagram of a computer system in accordance with an embodiment. In the example illustrated by FIG. 6, computer system 600 includes a processing resource 610 coupled to a non-transitory, machine readable medium 620 encoded with instructions to perform a proactive auto-scaling method in accordance with a private cloud embodiment. The processing resource 610 may include a microcontroller, a microprocessor, central processing unit core(s), an ASIC, an FPGA, and/or other hardware device suitable for retrieval and/or execution of instructions from the machine readable medium 620 to perform the functions related to various examples described herein. Additionally or alternatively, the processing resource 610 may include electronic circuitry for performing the functionality of the instructions described herein.

The machine readable medium 620 may be any medium suitable for storing executable instructions. Non-limiting examples of machine readable medium 620 include RAM, ROM, EEPROM, flash memory, a hard disk drive, an optical disc, or the like. The machine readable medium 620 may be disposed within the computer system 600, as shown in FIG.

6, in which case the executable instructions may be deemed "installed" or "embedded" on the computer system 600. Alternatively, the machine readable medium 620 may be a portable (e.g., external) storage medium, and may be part of an "installation package." The instructions stored on the machine readable medium 620 may be useful for implementing at least part of the methods described herein.

In the context of the present example, the machine readable medium 620 is encoded with a set of executable instructions 630-660. It should be understood that part or all of the executable instructions and/or electronic circuits included within one block may, in alternate implementations, be included in a different block shown in the figures or in a different block not shown.

Instructions 630, upon execution, cause the processing resource 610 to provide a configuration-driven continuous delivery pipeline. In one embodiment, instructions 630 may correspond generally to instructions for performing block 210 of FIG. 2.

Instructions 640, upon execution, cause the processing resource 610 to receive a trigger event specifying a repository. In one embodiment, instructions 640 may correspond generally to instructions for performing block 220 of FIG. 2.

Instructions 650, upon execution, cause the processing resource 610 to configure the pipeline based on a first set of configuration information stored in the repository. In one embodiment, instructions 650 may correspond generally to instructions for performing the block 230 of FIG. 2.

Instructions 660, upon execution, cause the processing resource 610 to perform the stages of the pipeline by causing the pipeline to issue a subset of commands to an executor based on a second set of configuration information stored in the repository. In one embodiment, instructions 660 may correspond generally to instructions for performing block 240 of FIG. 2.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
    providing a configuration-driven continuous delivery (CD) pipeline including a plurality of stages, wherein all commands to be run by a particular executor of a plurality of executors used by a particular development team of a plurality of development teams are specified by the configuration-driven CD pipeline;
    receiving a first trigger event from an external source specifying a repository in which source code for an application being developed or maintained by the particular development team resides;
    responsive to the first trigger event, configuring the configuration-driven CD pipeline with information regarding a plurality of subdirectories within the repository that are to be processed by the configuration-driven CD pipeline based on a first set of configuration information stored in the repository;
    receiving a second trigger event specifying a second repository in which source code for a second application being developed or maintained by a second development team resides;
    responsive to the second trigger event, configuring the configuration-driven CD pipeline with information regarding a plurality of subdirectories within the second repository that are to be processed by the configuration-driven CD pipeline based on a first set of configuration information stored in the second repository; and
    performing each of the plurality of stages by, for each subdirectory of the plurality of subdirectories, causing the configuration-driven CD pipeline to issue a subset of the commands to the particular executor based on a second set of configuration information associated with the subdirectory.

2. The method of claim 1, wherein the first set of configuration information is contained within a first configuration file stored in a predetermined or configurable location within the repository.

3. The method of claim 1, wherein the second set of configuration information is contained within a structured configuration file stored in the subdirectory.

4. The method of claim 1,
    wherein performing each of the plurality of stages causing the configuration-driven CD pipeline to issue a second subset of the commands to a second executor based on a second set of configuration information associated with the subdirectory of the plurality of subdirectories within the second repository.

5. The method of claim 2, wherein the first configuration file comprises a structured configuration file.

6. The method of claim 3, wherein the plurality of stages include a build stage, a testing stage and a deployment stage.

7. The method of claim 3, wherein each subdirectory of the plurality of subdirectories represents a component of the application.

8. The method of claim 6, wherein the structured configuration file stored in the subdirectory includes a section of configuration settings for each of the plurality of stages.

9. A system comprising:
    a processing resource; and
    a non-transitory computer-readable medium, coupled to the processing resource, having stored therein instructions that when executed by the processing resource cause the processing resource to:
    receive a first trigger event from an external source specifying a repository in which source code for an application being developed or maintained by a particular development team of a plurality of development teams resides;
    responsive to the first trigger event, configuring a configuration-driven CD pipeline with information regarding a plurality of subdirectories within the repository that are to be processed by the configuration-driven CD pipeline based on a first set of configuration information stored in the repository, wherein all commands to be run by a particular executor of a plurality of executors used by the particular development team are specified by the configuration-driven CD pipeline;
    receiving a second trigger event specifying a second repository in which source code for a second application being developed or maintained by a second development team resides;
    responsive to the second trigger event, configuring the configuration-driven CD pipeline with information regarding a plurality of subdirectories within the second repository that are to be processed by the configuration-driven CD pipeline based on a first set of configuration information stored in the second repository; and
    performing each of a plurality of stages of the configuration-driven CD pipeline by, for each subdirectory of the plurality of subdirectories, causing the configuration-driven CD pipeline to issue a subset of the commands to the particular executor based on a second set of configuration information associated with the subdirectory.

10. The system of claim 9, wherein the first set of configuration information is contained within a first configuration file stored in a predetermined or configurable location within the repository.

11. The system of claim 9, wherein the second set of configuration information is contained within a structured configuration file stored in the subdirectory.

12. The system of claim 9, wherein the trigger even comprises a webhook from the repository.

13. The system of claim 11, wherein the plurality of stages include a build stage, a testing stage and a deployment stage.

14. The system of claim 11, wherein each subdirectory of the plurality of subdirectories represents a component of the application.

15. The system of claim 13, wherein the structured configuration file stored in the subdirectory includes a section of configuration settings for each of the plurality of stages.

16. A non-transitory machine readable medium storing instructions executable by a processing resource of a computer system, the non-transitory machine readable medium comprising instructions to:
receive a first trigger event from an external source specifying a repository in which source code for an application being developed or maintained by a particular development team of a plurality of development teams resides;
responsive to the first trigger event, configuring a configuration-driven CD pipeline with information regarding a plurality of subdirectories within the repository that are to be processed by the configuration-driven CD pipeline based on a first set of configuration information stored in the repository, wherein all commands to be run by a particular executor of a plurality of executors used by the particular development team are specified by the configuration-driven CD pipeline;
receiving a second trigger event specifying a second repository in which source code for a second application being developed or maintained by a second development team resides;
responsive to the second trigger event, configuring the configuration-driven CD pipeline with information regarding a plurality of subdirectories within the second repository that are to be processed by the configuration-driven CD pipeline based on a first set of configuration information stored in the second repository; and
performing each of a plurality of stages of the configuration-driven CD pipeline by, for each subdirectory of the plurality of subdirectories, causing the configuration-driven CD pipeline to issue a subset of the commands to the particular executor based on a second set of configuration information associated with the subdirectory.

17. The non-transitory machine readable medium of claim 16, wherein the second set of configuration information is contained within a Yet Another Markup Language (YAML) file stored in the subdirectory.

18. The non-transitory machine readable medium of claim 16, wherein each subdirectory of the plurality of subdirectories represents a component of the application.

19. The non-transitory machine readable medium of claim 16, wherein the trigger event comprises a webhook from the repository.

20. The non-transitory machine readable medium of claim 17, wherein YAML file includes a section of configuration settings for each of the plurality of stages.

* * * * *